Figure 1:
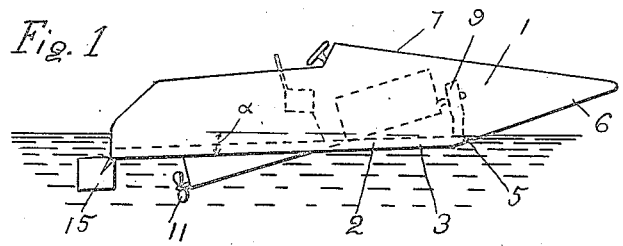

L. A. DUNAJEFF.
POWER BOAT.
APPLICATION FILED APR. 18, 1921.

1,412,848.

Patented Apr. 18, 1922.
3 SHEETS—SHEET 1.

INVENTOR.
Leonid A. Dunajeff
By John P. Nixon
ATTORNEY.

INVENTOR.
Leonid A. Dunajeff
By John P. Nixonow
ATTORNEY.

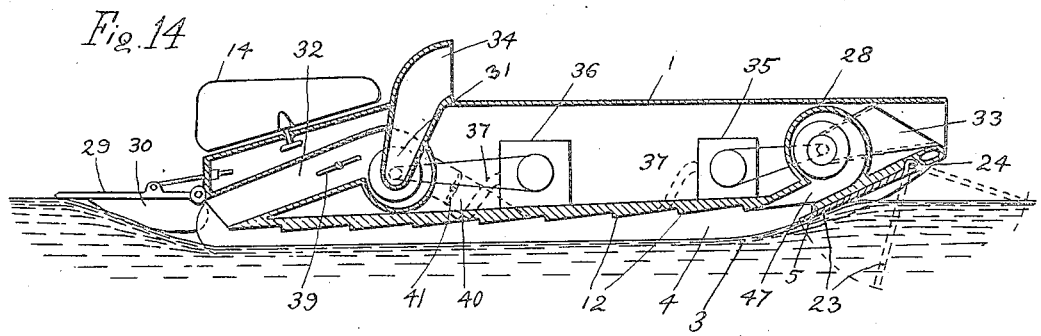
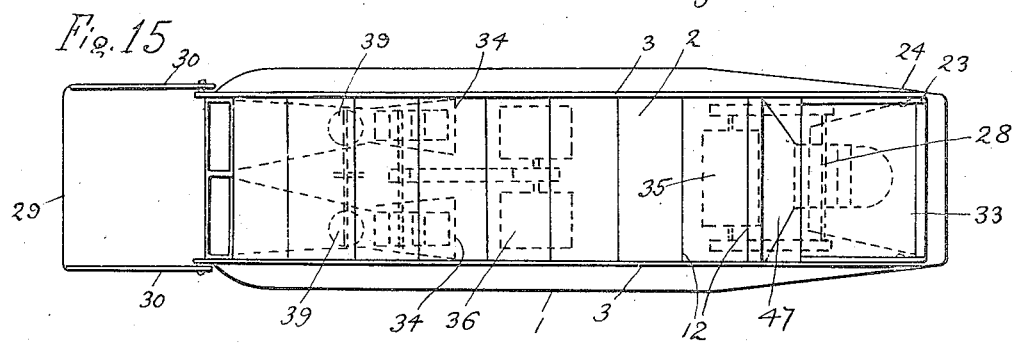
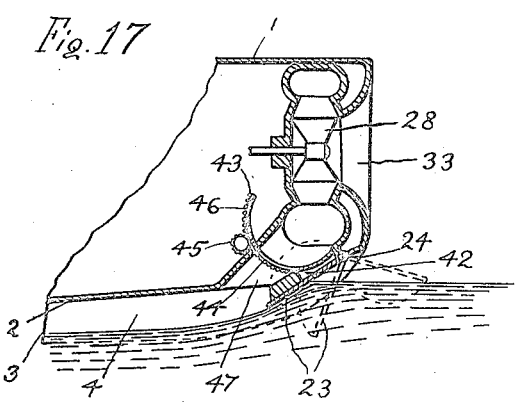
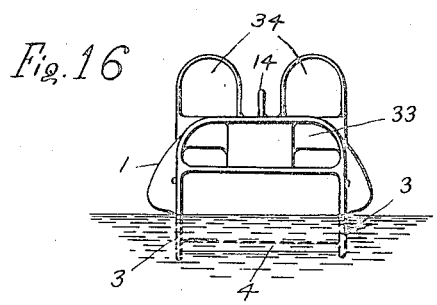
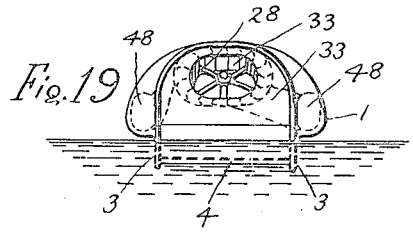
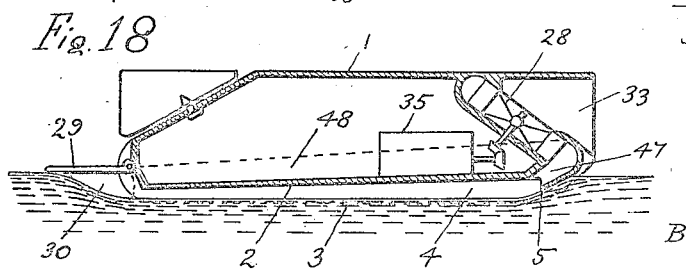

UNITED STATES PATENT OFFICE.

LEONID A. DUNAJEFF, OF NEW YORK, N. Y.

POWER BOAT.

1,412,848.  Specification of Letters Patent.  Patented Apr. 18, 1922.

Application filed April 18, 1921. Serial No. 462,268.

*To all whom it may concern:*

Be it known that I, LEONID A. DUNAJEFF, citizen of Russia, and resident of New York, in the county of New York and State of New York, have invented certain new and useful Improvements in Power Boats, of which the following is a specification.

My invention relates to power boats and has a particular reference to the boats designed for a high speed.

The object of my invention is to provide a boat or a ship of a very low resistance to its propulsion, so as to obtain much higher practical speeds than it was heretofore possible with other constructions.

The total resistance to the boat propulsion consists mainly of the following elements:

1. Resistance due to the water friction,
2. Resistance due to the pressure of the water or head resistance,
3. Resistance due to the formation of waves and streamline currents,
4. Air resistance.

Ordinary boats have the same displacement at rest and in motion, and they have consequently a relatively large wet surface subject to the frictional resistance and a large bulk of the hull in the water producing large head and wave resistances. At high speeds these resistances become so high, that the power required becomes entirely out of proportion with the size of the boat or ship. The other type of boats, called "hydroplanes", "skimming" or "surface" boats, is distinguished by a more or less flat bottom set at an angle to the line of motion, the hull being so proportioned that with the higher speeds a lifting force is produced which tends to raise the forward part of the hull out of the water thereby reducing its resistance.

The main objection to this arrangement is that the forward exposed portion of the hull, being suspended in the air by the combined and opposed actions of the velocity and gravity and depending on the angle of incidence of the bottom of the boat with the water surface, is apt to change its position with the slightest changes in the factors mentioned. Comparatively small waves are liable to produce violent oscillations of the boat.

At the same time, such a position of the boat requires for the submerged portion a comparatively large angle of incidence, producing a large head resistance which is proportional to the square of the sine of this angle. For these reasons, for instance, the hydroplane type of construction is not applicable to the larger ships.

In my improved boat, I am also using a substantially flat bottom set at an angle with the line of movement, so that the velocity will have a vertical or lifting component tending to raise the hull partly out of the water as in hydroplanes. But in my boat its forward portion remains on the surface of the water, and only the rear end becomes raised at higher speeds, so that the angle of incidence or the angle with which the bottom meets the water level, becomes quite small, even up to a fraction of one degree of a circle, the boat almost floating on top of the water surface. Consequently at higher speeds the resistances due to the water pressure, eddy currents, wave formation and streamline effect, become comparatively small. The frictional resistance would have been large, however, almost like in ordinary boats, on account of the large surface of the bottom remaining on the water. In order to reduce this resistance I introduce a layer of the air between the water and the bottom surface of the boat, using various means to maintain and renew this air layer or cushion.

My construction is especially advantageous for high powered boats or ships with a very small operating angle of incidence at high speeds, because in such cases, as it will be hereinafter explained, the stability of the boat and its resistance to the oscillations or rolling become very high.

My invention is more fully described in the accompanying specification and drawings in which—

Figure 2:
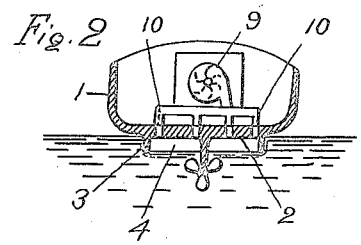
Figure 3:
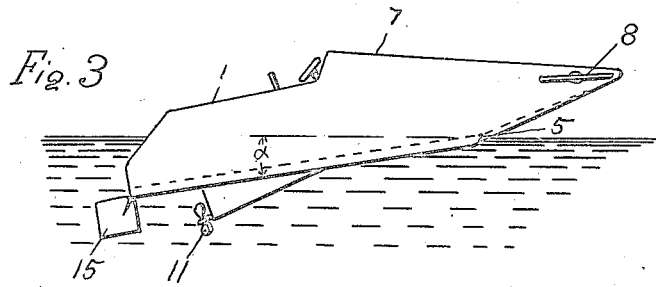
Figure 4:
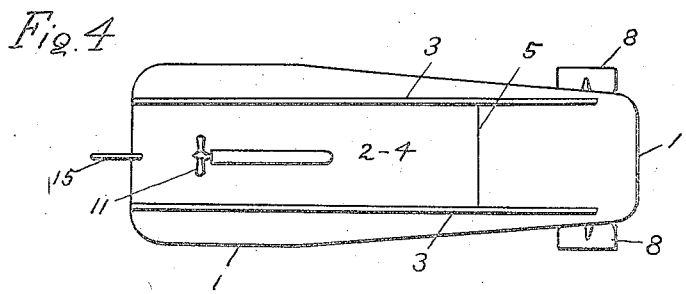
Figure 5:
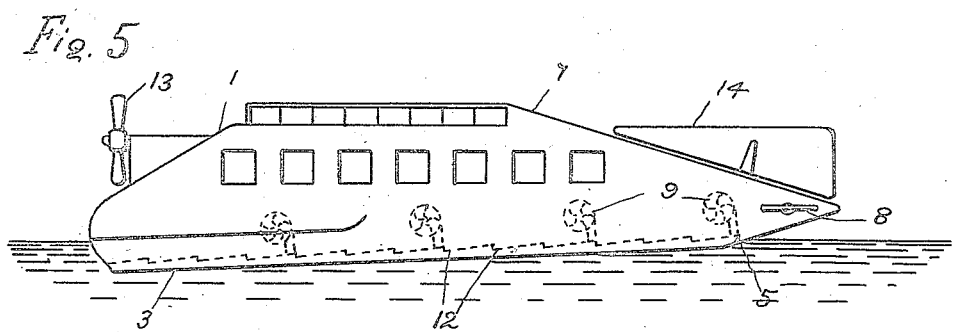
Figure 6:
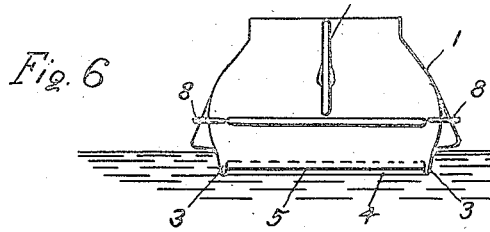
Figure 7:
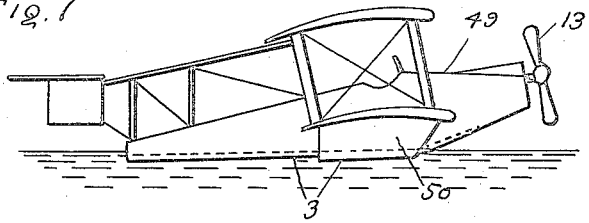
Figure 8:
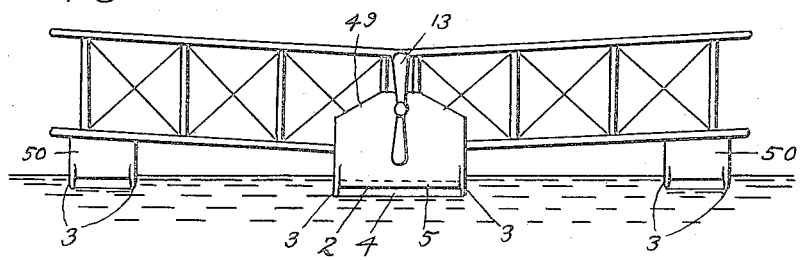
Figure 9:
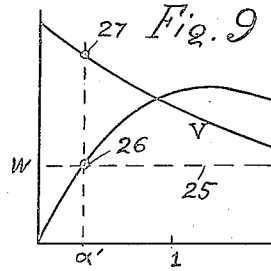
Figure 10:
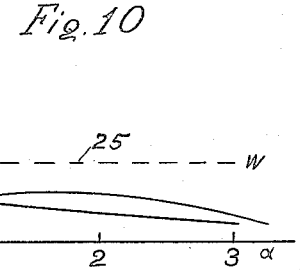
Figure 11:
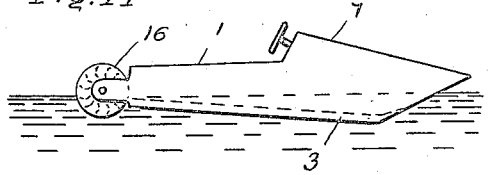
Figure 12:
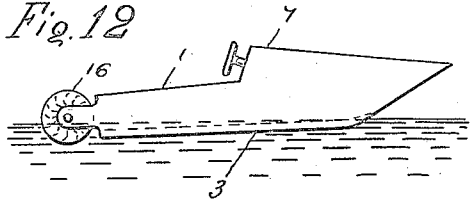
Figure 13:
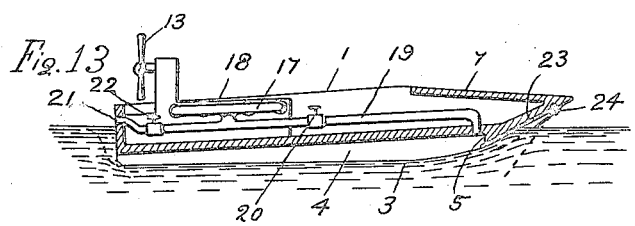

Fig. 1 is an elevation of my boat in operating condition at high speeds with its rear end partly raised towards the surface of the water and with a small angle of incidence "a". Fig. 2 is a crosssection showing also an engine operated blower for forcing the air under the bottom of the boat. Fig. 3 is an elevation of the same boat at rest with the rear end fully submerged. Fig. 4 is a bottom view showing longitudinal air retaining ribs. Fig. 5 is an elevation of a large ship, Fig. 6 is a front view of same, Fig. 7 and Fig. 8 are views of a hydro airplane with my improved fuselage and pontoons. Fig. 9 is a curve illustrating the variations of the velocity "V" and of the lifting force "P" in relation to the changes of the angle of incidence "a". Fig. 10 represents a similar curve for an ordinary boat without my improvements. Fig. 11 is an elevation of a modified boat at rest with the forward portion submerged. Fig. 12 is the same in motion. Fig. 13 is a sectional elevation of a boat, in which the exhaust gases from the engine are forced under the bottom. Fig. 14 is a sectional elevation of a boat in which the propulsion is accomplished by means of a turbine blower. Fig. 15 is a bottom plan view, and Fig. 16 is an end view, Fig. 17 is a sectional view of a modified blower arrangement, as are also Figs. 18 and 19.

My boat consists of a body or hull 1 with a more or less flat bottom 2 and longitudinal ribs or ridges 3 extending through the full length of the submerged portion of the boat. The bottom surface and these ribs form a channel 4 for the air. A step 5 may be provided near the front end in order to retain the air at comparatively slow speeds. At high speeds the air is forced under the boat, being compressed under the inclined forward portion 6. The ribs 3 may be extended almost to the bow, so that they may retain the air even when the boat rides over the waves. The bow is raised above the water to prevent the nosing of the boat under the waves. But as this raised portion may have a tendency at high speeds to be lifted higher by the air pressure, thus reducing the total submerged length, I am providing a fore deck 7 inclined at an opposite angle in such a manner, that the air pressure below and above the deck are balanced, so that the front ridge or step 5 touches the water at all speeds, which condition is important for the proper operation of my boat. Additional guiding planes or ailerons 8 may be provided in order to properly adjust the operating position of the front end of the boat.

In order to get full benefit of the air cushion or layer 4, its width must be comparatively large, so that my boat is made almost as wide at the front as it is at the rear, and the distance between the ribs 3 is the same through the length of the boat.

In order to get the air under the boat, especially at slow speeds, an air blower 9 may be used, forcing the air through the channels 10. The weight of the boat is so distributed, that at rest, the rear portion of the boat sinks deeper than the front end until enough water is displaced to support the weight of the boat. The angle "a" is then comparatively large, but at high speeds a lifting force is developed, tending to raise the hull out of the water, especially its rear portion, thereby decreasing the angle "a".

If the boat is propelled by an ordinary screw propeller 11, the same must be placed at a proper depth so as not to disturb the air layer 4.

Additional steps 12 may be provided at the bottom in order to retain at least a portion of the air, when the boat is rolling and pitching on heavy seas. While the air may be washed from under the bottom by the action of the waves, some of the air will be retained in the inside corners of these steps, and there will be continuous forcing of the air from one step to the other towards the stern.

At high speeds, such as may be obtained with my boat,—in excess of one hundred miles per hour, for instance,—an ordinary screw propeller becomes inefficient so that I prefer to use an airplane type screw propellor 13, as is shown in Figures 5 and 13. An air rudder 14 on the deck is also more efficient than an ordinary water rudder 15.

My hull construction with the air cushioned bottom may be advantageously applied to ordinary hydro aeroplanes, as shown in Figures 7 and 8. The main fuselage 49 may be so equipped, and also the end pontoons 50. This arrangement enables the aeroplane to rise quicker and to propel itself on the water or to "taxi" on the water at high speeds.

The boat may be also constructed in such manner, that its forward portion will be immersed in the water when at rest, as it is shown in Figures 11 and 12. This arrangement may be useful in case when the boat is propelled by the paddle wheel 16. The operative position of the hull at a normal speed will be the same relatively as in case of a construction shown in Fig. 1.

In case the boat is equipped with an internal combustion engine, the exhaust gases may be utilized to supply the gaseous layer under the hull, and this arrangement is illustrated in Fig. 13. The exhaust pipe 17 of the engine 18 has an extension pipe 19 with a regulating valve 20, through which the gases or a portion of them may be diverted under the bottom to the forward portion of the hull. The main exhaust pipe extension 21 also has a valve 22, which must be closed when the gases are directed through the pipe 19.

In order to prevent the gases from escaping when the bow of the boat is raised on the waves, a plate 23 (Fig. 13) may be employed pivoted at the point 24. The water pressure will keep it in a closed position pressed against the hull, but it will drop down, as it is shown with dotted lines, when the bow is pitched upwards on the waves, so that a certain amount of air will be retained under this plate, even if it leaves the water entirely for a moment. This air will be forced under the hull as soon as the boat returns to its normal position, and the plate swings against the hull.

Figures 9 and 10 represent comparative curves for the air cushioned boat and for the same boat without any air under the hull. The abscissæ correspond to angles of incidence "a", and against these abscissæ are plotted corresponding values for the velocities "V" and for the lifting force "P". The dotted line 25 corresponds to the total weight of the boat. The power of the motor is supposed to remain constant.

The character of the curves indicates, that without any air (curve Fig. 10) the boat may become unstable in its movement, as it may have considerable variations of the angle of incidence with but small variations of the velocity and of the lifting force, and there may even exist conditions, when for the same lifting force there will be two different angles of incidence. Consequently the boat may swing up and down and batter itself on the water while maintaining its speed. At the same time, if the boat is heavy, the lifting force may not be sufficient to raise the boat enough so as to reduce the angle "a" and consequently to bring the velocity "V" to the desired high value.

In case of an air layer under the bottom, the velocity becomes very high (curve Fig. 9), the lifting force also high, and the boat easily rises to a position, when the angle "a" becomes very small, as indicated by the points of intersection 26 and 27. It is important, however, to have the boat laying on the water with its full length, barely touching the water with its forward step 5, because if any considerable portion of the ship hull leaves the water, then the angle immediately increases with a corresponding increase of the resistance and decrease of the velocity and of the lifting force.

Inspection of the curve Figure 9 reveals, that when the boat skims over the water at a very small angle "a" and with the velocity and lifting force as indicated by the points 26 and 27, then the conditions of stability become extremely favorable. Indeed, the slightest increase of the angle will be immediately followed by a large increase of the lifting force, causing the boat to rise and, therefore, reducing again the value of the angle "a". Consequently the boat will have a strong tendency to retain its longitudinal angular position, the curves from V and P being steep at points near zero angle "a".

In order to make the boat stable on the rolling sea it may be made comparatively wide, because with its small displacement the resistances depend on the total area only and not on the relation of the width to the length.

The stability may be further increased by the use of some well known devices for this purpose, such as gyroscopic stabilizers.

On heavy seas the waves may wash out some of the air from under the hull, and in this case the toothed bottom, consisting of numerous steps 12, may be used to the advantage, because some of the air will be retained under the teeth.

Figures 14, 15 and 16 represent a modified arrangement of my boat, using powerful air blowers 28 in the forward portion of the boat. These blowers supply the air under compression for the bottom compartment 4 between the ribs 3. The air moves continuously towards the rear of the boat and comes out from under the stern. The reaction of the expanding air leaving the boat propels the boat forward. The stern is provided with an adjustable extension plate 29 with side ribs or walls 30. The air, moving under this plate, forces the water out with equally distributed pressure thereby producing a perfect streamline extension to the boat and reducing the eddy losses in the water.

Additional blowers 31 may be placed near the stern to provide more air for the boat propulsion, directing this air through the channels 32 under the stern.

The receiving air pipes 33 and 34 are directed against the movement of the boat, so that the air resistance, even at high speeds, is practically eliminated, all of the oncoming air being sucked in by the blowers. Exhaust gases from motors 35 and 36 are directed by the pipes 37 under the boat. No back pressure will be developed in this case, as the moving air will help to carry the gases rapidly away.

A butterfly valve 39 may be used to regulate the motor speed by regulating the passages for the air. In case of centrifugal blowers this action will also automatically regulate the load of the motors.

Additional pipes 40 may be connected to the blowers, directing the air to the forward portion of the boat. Valves 41 ordinarily keep these pipes closed. By opening these valves and closing valves 39, the flow of air will be diverted towards the front end of the boat, thus producing a retarding or braking effect on its movement.

A similar construction is shown in Figure 17. Here the hinged plate 23 covers an opening 42 in the front wall of the boat, and this opening is also closed with a sliding valve 43. An aperture 44 in this valve admits the air from the blower 28 under the bottom. By moving the valve with a pinion 45 and a rack 46, the passage 47 becomes closed, and the air pressure, acting through uncovered aperture 42, moves the plate 23 away. The air pressure, being directed towards the front end of the ship, will tend to stop the ship movement.

A single blower 28 (Fig. 18) may be used to supply the air under the bottom and to propel the boat. For this purpose a portion of the air is directed through tubular passages 48 on the sides of the ship towards the stern and under the stern plate 29.

This method of ship propulsion, consisting in blowing the air under the ship bottom from the bow of the ship towards the stern, is very efficient and possesses some other advantages, its efficiency being partly due to the compressibility of the air, so that the blowers produce a vacuum in front of the ship and a quantity of a compressed air in the rear. The propelling force is produced partly by this vacuum and partly by the reaction of the compressed and expanding air. The flow of the air separates the surface of the ship from the water, thereby reducing the frictional resistances. The air resistance is considerably reduced and may be practically eliminated, when all of the crosssectional surface of the ship is utilized for the air intake.

This method differs substantially from the known method of ship propulsion by means of the water pumps, drawing the water through special tubes from the forward portion of the ship to the rear. The water, being incompressible, absorbs a considerable amount of the motive power in an inelastic shock and eddies, and the resistance, due to the increased contact surface with the water, is largely increased.

The advantages of my boat and method of propulsion are as follows:

The boat can be propelled at a very high speed with comparatively small expenditure of power, the resistances being greatly reduced, first, by the introduction of the air under the bottom, second by the lifting of the boat to the surface of the water.

The boat may be made very large and wide so as to better resist the waves. My construction can be fully applied to the largest ocean going ships.

My boat can navigate very shallow waters.

With my method of propulsion by means of air blowers it is possible to utilize high speed, efficient and light prime movers, such as turbines or Diesel engines.

The exhaust of the internal combustion engines is more fully utilized in my boat.

I claim as my invention:

1. In a power boat, the combination with a hull, longitudinally arranged ribs under said hull, means to introduce a gas under said hull between said ribs, and means to form a gaseous streamline extension back of the stern of said hull.

2. In a power boat, the combination with a hull, longitudinally arranged ribs under said hull, a blower in the forward portion of said hull, an air intake for said blower, directed against the movement of said boat, an air duct for said blower under said hull, a blower in the aft of said hull, and an air duct for said aft blower, directed under and aft of said hull.

3. In a power boat, the combination with a hull, longitudinal ribs under said hull, a plurality of substantially flat surfaces between said ribs, means to introduce a layer of compressed gases between said flat surfaces and the water, and a flat extension back of the stern of said hull adapted to receive the excess of gases from under said hull.

4. In a power boat, the combination with a hull, means to introduce the gases under said hull, and means to form a streamline extension with a quantity of said gases behind said hull in the water.

5. In a power boat, the combination with a hull, means to introduce gases under said hull, longitudinally arranged ribs under said hull from stern to bow evenly spaced apart, means to introduce the air under said hull, and means to prevent said air from escaping from under the forward portion of said hull on the waves in a rough sea.

6. In a power boat, the combination with a hull, said hull being of approximately the same width from stern to bow, a plurality of longitudinally arranged ribs under said hull, and a plate in front of said hull hinged above the water and extending under water.

7. In a power boat, the combination with a hull, a plurality of ribs under said hull, extending above the water on the ends, a plurality of substantially flat surfaces under said hull and between said ribs, and a plate in front of said hull extending in the water below said hull and hinged above the water between said ribs.

8. In a power boat, the combination with a hull, means to introduce gases under said hull, and a horizontally arranged extension plate back of said hull adapted to retain a quantity of said gases forming an extension of the gas stream aft of the stern.

Signed at New York, in the county of New York and State of New York, this fifteenth (15) day of April, A. D. 1921.

LEONID A. DUNAJEFF.